Figure 1:
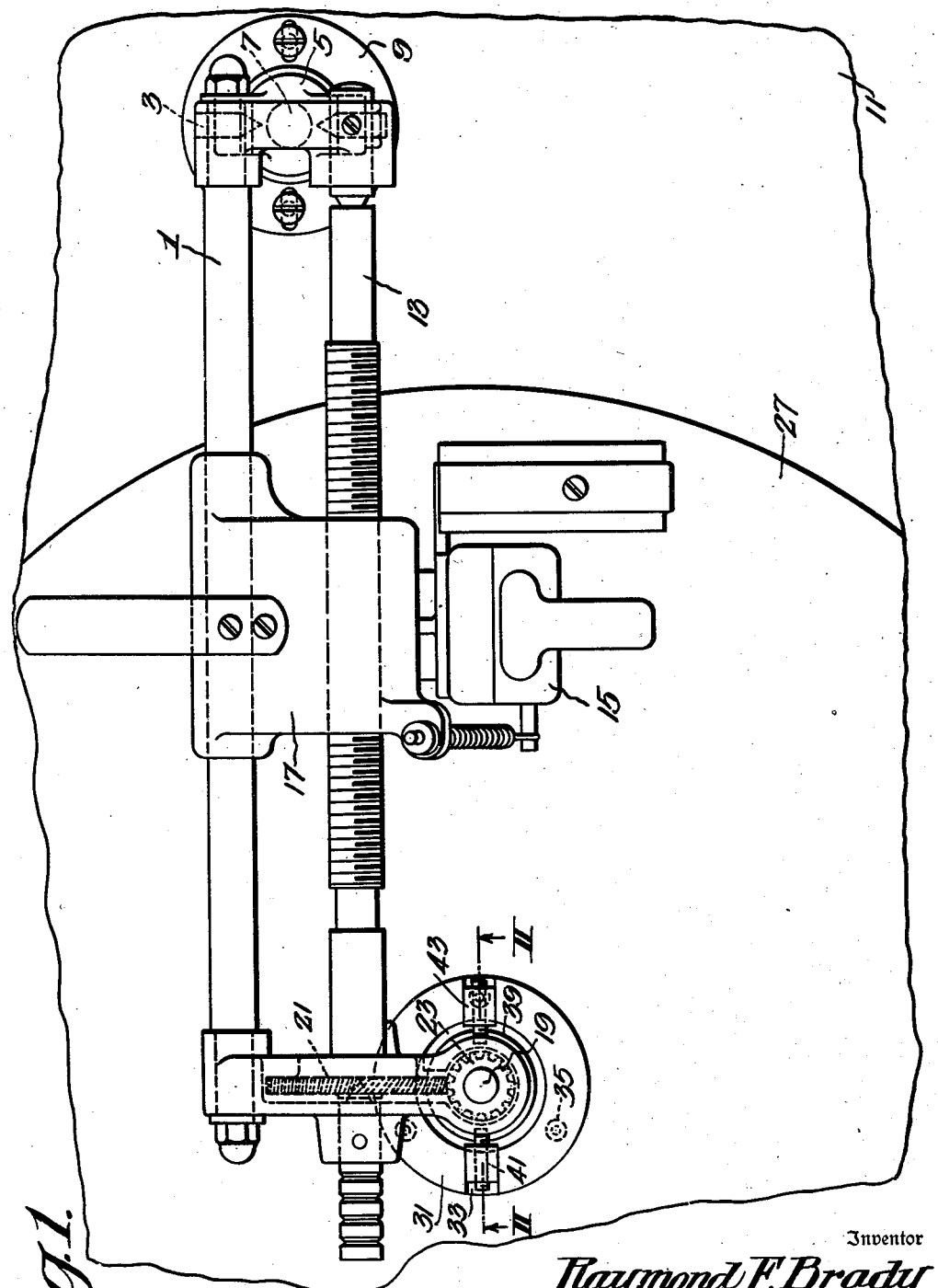

March 17, 1942. R. F. BRADY 2,276,459
PHONOGRAPHIC APPARATUS
Filed May 31, 1939 2 Sheets-Sheet 1

Inventor
Raymond F. Brady
By
Attorney

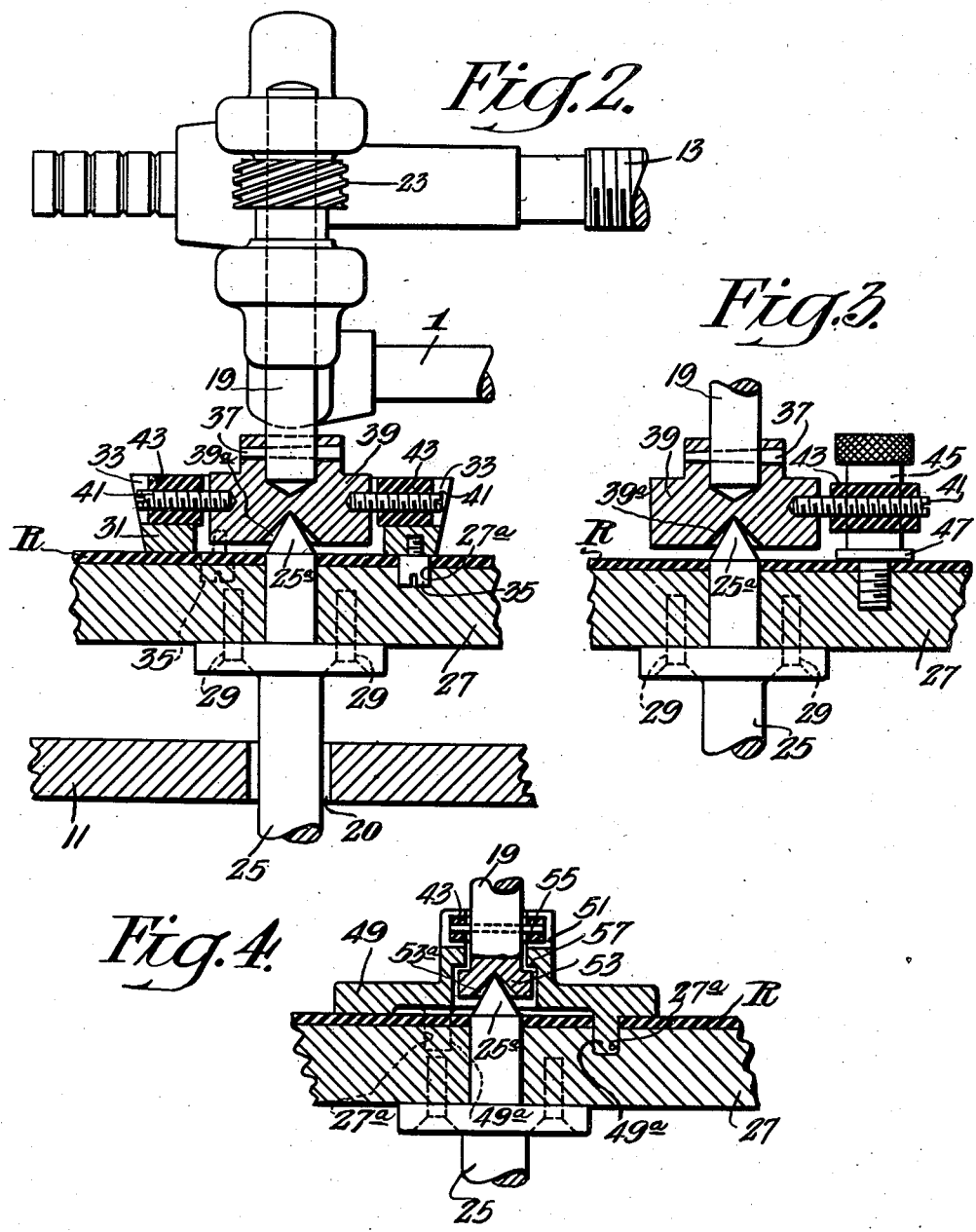

Patented Mar. 17, 1942

2,276,459

UNITED STATES PATENT OFFICE 2,276,459

PHONOGRAPHIC APPARATUS

Raymond F. Brady, Merchantville, N. J., assignor to Radio Corporation of America, a corporation of Delaware Application May 31, 1939, Serial No. 276,604

10 Claims. (Cl. 64—11)

This invention relates to phonographic apparatus of the type used for recording sound records adapted to be played back immediately, and more particularly to the mechanism which couples the turntable spindle with the cutter head feed screw for transferring power to the latter.

The primary object of my present invention is to provide an improved drive coupling between the turntable spindle and the feed screw which will operate smoothly and uniformly and without binding.

More particularly, it is an object of my present invention to provide an improved drive coupling as aforesaid which will insure accurate centering of the feed screw mechanism relative to the turntable spindle so that irregularities in transmitted power due to slight irregularities of the turntable shaft will be avoided.

Another object of my present invention is to provide an improved drive coupling as aforesaid which will help materially in avoiding wobble of the cutter as it is fed across the record blank.

It is also an object of my invention to provide an improved coupling mechanim as aforesaid which is simple in construction and highly efficient in use.

According to one form of my invention, the device consists of an annular ring which positively engages the record disc and turntable by means of suitable pins located to mate with aligned holes in the record and the turntable. The turntable spindle, to which the turntable is fixed for rotation therewith, protrudes above the turntable and terminates in a cone tip of relatively small taper to mate with a conical seat of relatively large taper formed either directly on the lower end of a shaft which is coupled to the cutter head feed screw, or on a member carried by said shaft. Since the conical seat has a larger taper than the spindle tip, it is obvious that the two cones will have only a point contact at the apices of the cones and will provide lateral centering between the turntable and the feed screw mechanism. Also, the spindle acts as a vertical bearing for the feed screw mechanism. The driving coupling between the aforesaid member and the annular ring is obtained by means of diametrically extending pins on said member which are received in a diametrical slot in the annular ring and which are preferably covered with soft rubber sleeves, the latter serving to absorb mechanical vibrations arising in the turntable mechanism and thus preventing their transmission to the cutter head. If desired, the ring weight may also serve as a record weight when the record is to be played back.

In another form of my invention, a single pin may be screwed into the turntable in radially spaced relation to the spindle and may be engaged by one of the rubber covered pins extending from the shaft or from the aforesaid member, as the case may be. This screw may also be arranged to clamp the record to the turntable so that no slipping therebetween will take place.

The novel features that I consider characteristic of my invention are set forth with particularity in the appended claims. The invention itself, however, both as to its organization and method of operation, as well as additional objects and advantages thereof, will best be understood from the following description of several embodiments thereof when read in connection with the accompanying drawings, in which Figure 1 is a top plan view of a machine embodying one form of my invention, Figure 2 is an enlarged sectional view taken along the plane of the line II—II of Fig. 1, Figure 3 is a view similar to Fig. 2 of a modified form of my invention, and Figure 4 is a similar view of still another form of my invention.

Referring more particularly to the drawings, wherein similar reference characters designate corresponding parts throughout, I have shown, in Fig. 1, a frame member 1 having one end pivotally supported by a pair of conical bearings 3 for swinging movement in a vertical plane. The bearings 3 are carried by a yoke member 5 which has a downwardly extending pin 7 received within a bearing 9 which is fixed to a motor board 11. The pin 7 permits rotation of the frame 1 in a horizontal plane and, in connection with the pivot pins or bearings 3, enables the frame 1 to partake of universal movement in relation to the bearing 9 and the motor board 11.

Rotatably carried by the frame 1 is a feed screw 13 which is adapted to feed across a record R a sound translating device 15, which may be either a cutter head or a pickup device. The sound translating device 15 is suitably mounted on a carriage 17 which is slidable along the frame 1 and is provided with a half nut (not shown) arranged for threaded engagement with the threads of the feed screw 13 in a well known manner. Power is delivered to the feed screw 13 from a shaft 19 through suitable gearing 21—23 in a manner which is already known in the art and which, therefore, is not believed to require further description.

Extending through an opening 20 in the motor board 11 (Fig. 2) is a spindle 25 driven by a suitable motor (not shown) and having a turntable 27 fixed thereto, as by means of a plurality of screws 29, so that the turntable 27 will rotate as a unit with the spindle 25. The spindle protrudes above the turntable 27 and terminates at its upper end in a conical tip 25a of relatively small taper. The turntable 27 is provided, in the modification shown in Fig. 2, with a plurality of openings 27a which are radially spaced from the spindle 25 and are in circumferentially separated relation around the spindle 25. A relatively heavy, annular ring 31 provided with a diametrically extending slot 33 has the same number of screws 35 threaded therein as there are openings 27a in the turntable 27, the screws 35 being removably received within the openings 27a and constituting a driving engagement between the ring 31 and the turntable 27.

Fixed to the lower end of the shaft 19, as by a suitable cross pin 37, is a member 39 which is provided with a cone seat 39a of relatively large taper and in which the cone tip 25a of the spindle 25 is received, the two cones contacting only at their apices. A plurality of outwardly extending screws 41 are threaded into the member 39 in diametrically opposed relation and are received in the slot 33 to provide driving engagement between the ring 31 and the member 39. Preferably, sleeves 43 of soft rubber are placed around the screws 41 to act as shock absorbing or vibration damping elements to prevent transfer of small vibrations or irregular motion from the spindle 25 to the cutter 15. In operation, it is obvious that power will be transmitted from the motor driven spindle 25 to the turntable 27, thence to the ring 33 through the screws 35, and thence to the member 39 via the screws 41. From the member 39 power is transmitted to the shaft 19 through the cross pin 37 and thence, through the gearing 21—23, to the feed screw 13.

In Fig. 3 I have shown a greatly simplified construction wherein, in place of the ring 31, I employ a single pin 45 which is provided with a collar 47 and which is removably threaded into the turntable 27 in radially spaced relation to the spindle 25, the collar 47 serving to clamp the record R against the turntable 27. The construction is otherwise similar to that described in connection with Fig. 2 except that there is employed only one screw 47 which extends far enough to be engaged by the pin 45 upon rotation of the turntable.

In Fig. 4, I have shown another modification of my invention which in some respects is similar to that shown in Fig. 2. In the modification of Fig. 4, I provide an annular driving plate 49 having integral pins 49a thereon corresponding to the screws 35 of Fig. 2 and removably received within the openings 27a in the turntable 27. The upper end of the driving plate 49 is provided with a diametrical slot 51 corresponding to the diametrical slot 33 of the ring member 31. The shaft 19 of this modification extends downwardly into the driving plate 45 and is formed with an enlarged flange 53 which takes the place of the member 39 of Figs. 2 and 3 and which is provided with the conical seat 53a of relatively larger taper than the spindle tip 25a and corresponding to the seat 39a of Figs. 2 and 3. A diametrically extending cross pin 55 in the shaft 19 corresponds to the screws 41 of Fig. 2 and is received within the slot 51 to provide driving engagement between the driving plate 49 and the shaft 19. If desired, the cross pin 55 may be provided with the rubber sleeves 43 as in the previously described modification.

It will be noted that the external diameter of the member 39 in Fig. 2 is smaller than the internal diameter of the annular ring 31, and that the external diameters of the shaft 19 and its terminating flange 53 (Fig. 4) are smaller than the adjacent internal diameters of the upstanding portion of the driving plate 49. This permits slight adjustment of the shaft 19 relative to the spindle 25, so that the feed mechanism may be accurately centered on the conical tip 25a. Thus, the spindle 27 and the shaft 19 need only be in substantial axial alignment without danger of transmitting wobble to the cutter head 15. In connection with Fig. 4, it will also be noted that the drive plate 49 is provided with a shoulder 57 which prevents the shaft 19 from being withdrawn therefrom by engagement of the flange 53 therewith.

From the foregoing description, it will be apparent to those skilled in the art that my improved drive coupling not only permits accurate centering of the feed mechanism, but that it will provide smooth operation free from once-around bumping which is common to drive mechanisms of the prior art, and that it will also eliminate cutter wobble. It will also be obvious that the heavy, annular ring 31 of Fig. 2 may be used as a weight on a record to be reproduced and that the screws 35, passing through openings in the record R which are aligned with the openings 27a in the turntable 27, will positively lock the record to the turntable to prevent any slipping therebetween both during recording and during reproduction.

Although I have shown and described several embodiments of my invention, I am fully aware that many other modifications thereof are possible. Consequently, I wish it to be understood that I do not desire to limit myself except insofar as is made necessary by the prior art and by the spirit of the appended claims.

I claim:

1. In a phonograph, the combination of a driving spindle, a driven shaft in substantial axial alignment with said spindle, and power transferring means coupling said spindle and said shaft, said means comprising a turntable fixed to said spindle and rotatable therewith, said spindle protruding above said turntable, means removably coupled to said turntable and having driving engagement therewith at at least one point radially spaced from said spindle, a member resting on the protruding end of said spindle and carrying said shaft, and means affording a driving connection between said member and said last-named means.

2. In a phonograph, the combination of a driving spindle, a driven shaft in substantial axial alignment with said spindle, and power transferring means coupling said spindle and said shaft, said means comprising a turntable fixed to said spindle and rotatable therewith, said spindle protruding above said turntable and terminating in a tip of predetermined form, means removably coupled to said turntable at at least one point radially spaced from said spindle, a member having a seat therein of a form complemental to said first named form, said seat resting on said tip and said member carrying said shaft, and means providing a driving connection between said member and said last named means.

3. In a phonograph, the combination of a driving spindle, a driven shaft in substantial axial alignment with said spindle, and power transferring means coupling said spindle and said shaft, said means comprising a turntable fixed to said spindle and rotatable therewith, said spindle protruding above said turntable and terminating in a conical tip, means removably coupled to said turntable at at least one point radially spaced from said spindle, a member having a conical seat therein resting on said conical spindle tip, said member carrying said shaft, and means providing a driving connection between said member and said last-named means.

4. The invention set forth in claim 3 characterized in that the taper of said conical spindle tip is smaller than the taper of said conical seat, whereby only the apices of said cones are in contact to provide a point bearing between said spindle and said member.

5. The invention set forth in claim 3 characterized in that said last-named means includes a resilient element.

6. The invention set forth in claim 3 characterized in that said last-named means comprises an element extending radially outwardly from said member a distance sufficient to engage said first-named means, and a rubber sleeve surrounding said element.

7. In a phonograph, the combination of a driving spindle, a driven shaft in substantial alignment with said spindle, a turntable fixed to said spindle and rotatable therewith, said turntable being provided with a plurality of circumferentially separated openings spaced radially from said spindle, a member surrounding the axis of said spindle and carrying elements fitted into said openings whereby said member has driving engagement with said turntable, said member being provided with a diametrical slot, and means extending diametrically through said shaft and received within said slot whereby to provide driving engagement between said member and said shaft.

8. In a phonograph, the combination of a driving spindle, a driven shaft in substantial alignment with said spindle, a turntable fixed to said spindle and rotatable therewith, said spindle protruding above said turntable and terminating in a tip of predetermined form, said turntable being provided with a plurality of circumferentially separated openings spaced radially from said spindle, an annular member surrounding said spindle and carrying elements fitted into said openings whereby said member has driving engagement with said turntable, a second member carried by said shaft and having a seat therein of a form complemental to said first named form, said seat resting on said spindle tip, and means coupling said second member to said annular member, the internal diameter of said annular member being greater than the external diameter of said second member whereby said second member is received within said annular member.

9. In a phonograph, the combination of a driving spindle, a driven shaft in substantial alignment with said spindle, a turntable fixed to said spindle and rotatable therewith, said spindle protruding above said turntable and terminating in a cone tip of relatively small taper, said turntable being provided with a plurality of circumferentially separated openings spaced radially from said spindle, an annular driving plate surrounding said spindle and carrying elements fitted into said openings whereby said plate has driving engagement with said turntable, said shaft extending loosely into said annular member and terminating in a member provided with a cone seat of relatively large taper resting on said spindle tip, the apices of said cones providing the only contact between said shaft and said spindle and constituting a point bearing, and means coupling said shaft to said driving plate.

10. In a phonograph, the combination of a driving spindle, a driven shaft in substantial alignment with said spindle, a turntable fixed to said spindle and rotatable therewith, said spindle protruding above said turntable and terminating in a cone tip of relatively small taper, said shaft terminating in a member provided with a cone seat of relatively large taper, said cone seat resting on said cone tip with the apices of said cones constituting a single contact and bearing point between said spindle and said member, an upstanding element removably secured to said turntable in radially spaced relation to said spindle, and means extending radially outwardly from said member for engagement with said element whereby to provide driving engagement between said turntable and said shaft.

RAYMOND F. BRADY.